No. 715,487. Patented Dec. 9, 1902.
V. LAPP.
METALLIC STORAGE VESSEL FOR BEER OR THE LIKE.
(Application filed May 29, 1901.)
(No Model.) 2 Sheets—Sheet 1.

Witnesses:
Jacob Heller.
E. Hanusch.

Inventor:
Valentin Lapp
by J. B. Singer
atty

No. 715,487. Patented Dec. 9, 1902.
V. LAPP.
METALLIC STORAGE VESSEL FOR BEER OR THE LIKE.
(Application filed May 29, 1901.)
(No Model.) 2 Sheets—Sheet 2.

Witnesses:
Jacob Heller
C. Hanusch

Inventor:
Valentin Lapp
by B. Singer
atty

UNITED STATES PATENT OFFICE.

VALENTIN LAPP, OF LEIPZIG, GERMANY.

METALLIC STORAGE VESSEL FOR BEER OR THE LIKE.

SPECIFICATION forming part of Letters Patent No. 715,487, dated December 9, 1902.

Application filed May 29, 1901. Serial No. 62,309. (No model.)

*To all whom it may concern:*

Be it known that I, VALENTIN LAPP, brewer, a subject of the King of Saxony, residing at Lindenau, near Leipzig, in the Kingdom of Saxony, in the German Empire, have invented new and useful Improvements in Metallic Storage Vessels for Beer or the Like, of which the following is a specification.

A cellar plant for completely-closed metallic fermentation or storing vessels for beer, constructed according to the system hereinafter described, is distinguished by the fact that the free air-space compared with the whole of the interior space of the cellar and with the space occupied by the fermentation or store vessels is reduced in an extraordinary measure. By this means a comparatively very great saving in the whole of the space required for the storage of a certain definite number of fermentation or storing vessels of a certain definite size, as well as in the amount to be spent in the erection of the plant, is obtained. At the same time the amount of coldness required is greatly reduced and less hands need be employed. These effects are attained by inclosing the closed vessels as much as possible by the masonry of the walls in such a manner that they are accessible only from the way which their frontal sides or ends are directed to, the walls, however, and the ceiling of the cellar having openings affording access to the apertures for the filling-holes and manholes of the said vessels. There is thus around the latter no superfluous or too wide a space that must also be kept cool, so that in the whole only the contents of the vessels proper need be cooled.

In order to make my invention more clear, I refer to the accompanying drawings, in which similar letters denote similar parts throughout the several views, and in which—

Figure 1:
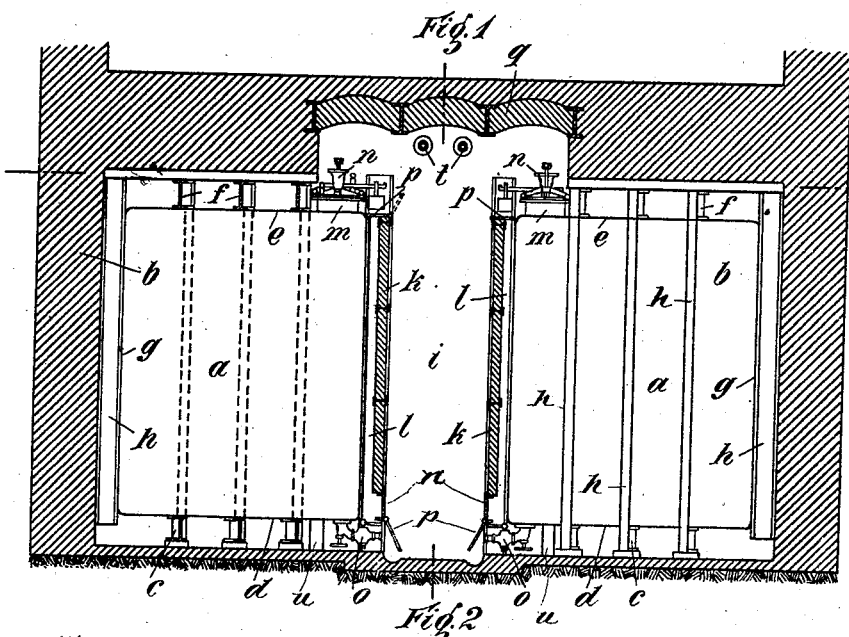
Figure 2:
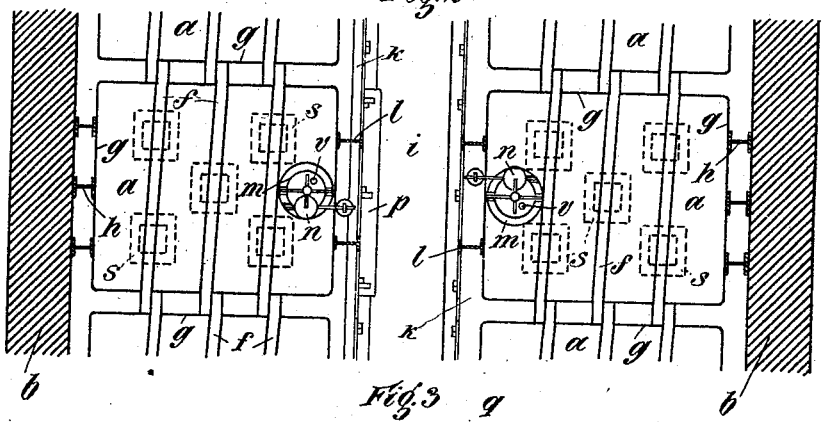
Figure 3:
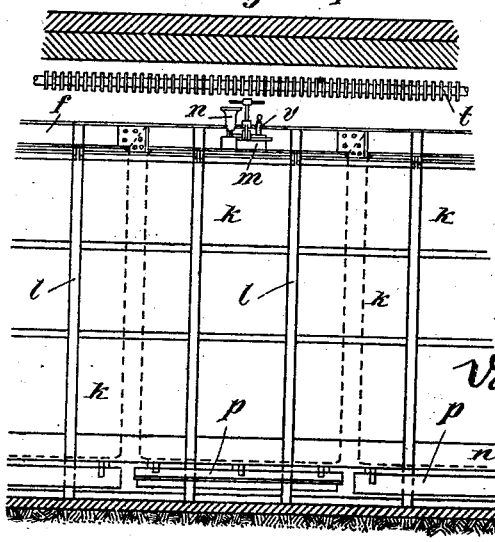

Figure 1 is a vertical section through a cellar plant constructed according to my invention. Fig. 2 is a plan view of that plant. Fig. 3 is a front view of the left-hand or right-hand part of the same; and Figs. 4 to 6 are views similar to Figs. 1 to 3, the vessels being cylindrical instead of cubic, and the rear parts of the top plate and bottom plate converging toward each other.

The vessels $a$ are completely closed and isolated from the masonry $b$. They are preferably located upon iron rails or girders $c$, which at the same time serve for reinforcing the large bottoms $d$ of said vessels; but said girders may be replaced, if desired, by single or separate supports or standards $s$, as shown in dotted lines in Fig. 2. In the same manner also the top plates $e$ of the latter may be reinforced by rails or girders $f$, lying against the ceiling of the cellar, and also the rear surfaces, as well as the sides $g$ $g$ of the vessels, may be reinforced by rails or girders $h$. The upper, lower, and lateral girders next to the way $i$ serve at the same time for separating the space around the rear and middle part of the vessels $a$ from the space around the front part of the same. The front end, which is directed to the way $i$, is preferably provided or covered with a protective wall $k$ and reinforced by rails or girders $l$. The walls $k$, supported by girders $w$, Figs. 1 and 3, may be covered with white Dutch tiles that allow of being easily cleansed and make the way $i$ look light, neat, and clean. A space is left between the said wall $k$ and the neighboring end of the respective vessel, so that cold air may pass upward through said space and cool the contents of that vessel also at the front end of same. Also the front part of the bottom, sides, and ceiling of the vessels is acted on by the cold air, but the other parts are not, because the respective spaces are separated from the front space by the girders that lie next to the way $i$, as already mentioned. The lower front girders may be replaced, if desired, by a correspondingly low wall $u$, Fig. 1, as may also the upper and the lateral front girders, or, in other words, the space containing the way $i$ may be separated from the space or spaces behind the front girders by a wall of masonry or the like, as is the case, for instance, in the form of construction shown in Figs. 4 and 5, which is hereinafter more fully described. The vessels have at their upper parts each a manhole $m$ and an opening $n$ for introducing the beer, and are further provided with thermometers $v$. At the bottom is a cock $o$ or the like. To prevent losses of coldness and to allow of a sterilization, the apertures that afford access to said cocks may be closed by air-tight flaps $p$, doors, slides, or the like, and by adjusting these flaps or the like the current of air passing upward through the spaces behind the walls $k$ may be regulated, so as also to regulate the cooling of the beer from that side. To afford access to the filling-openings and the manholes, the ceiling $q$ is made somewhat higher above said openings and holes. $t$ represents cooling-pipes located at and below said higher part of the ceiling.

Figure 4:
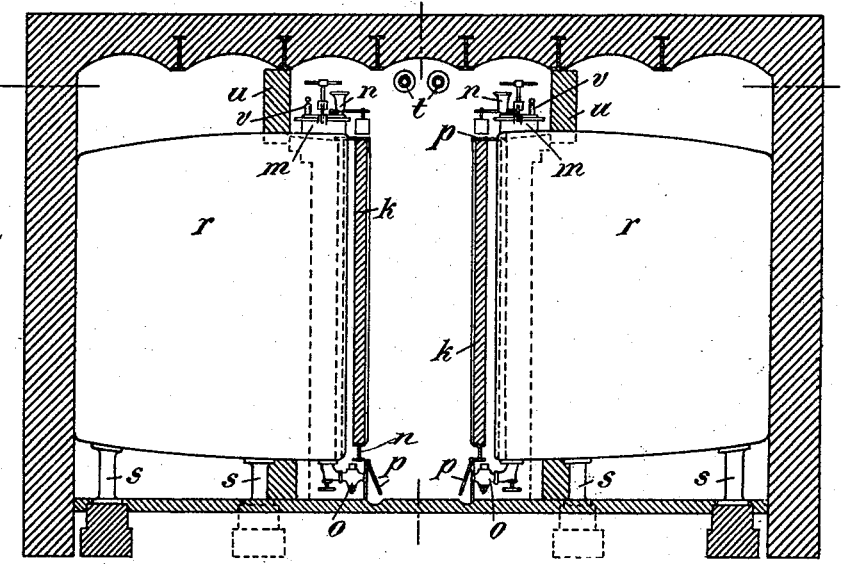
Figure 5:
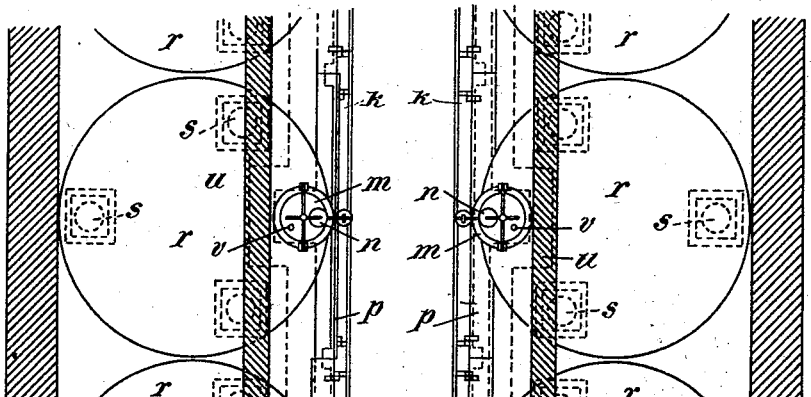
Figure 6:
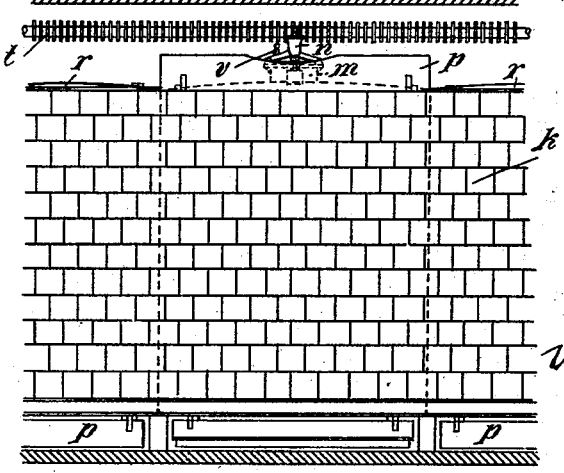

In the form of construction shown in Figs. 4 to 6 the vessels $r$ are supported by standards $s$, and the top plates of the vessels are inclined to the rear end, whereas the bottom plates are inclined to the front end, the object of the first-mentioned arrangement being to facilitate the removal of substances produced by or resulting from the after-fermentation and the like. The ceiling of the cellar has in this case no such higher part as in Fig. 1; or, more correctly, the whole ceiling has a correspondingly-higher position, and a special part, similar to $q$ in Fig. 1, is formed by the upper parts of walls $u$, extending from the bottom to the ceiling and located between the vessels $a$, the position of said walls being in all other respects such that a free access to the fittings of the vessels is afforded.

The metallic (iron) vessels are immovably connected with or secured within the cellar or first fixed to their supports and then surrounded by the masonry, whereafter their interior is made completely indifferent to beer. For the latter purpose I first produce inside the vessel a perfectly-clean pretty-indifferent metallic surface, cover the same with a ground layer of an enamel-glaze, and burn the latter. This glaze is then covered with a thin coating of an indifferent mass—for instance, composed of gypsum and lime, cement, or the like—which is allowed to dry, and water saturated with the same substances is filled in a very hot state into the thus-prepared vessels, whereafter that water is again boiled by means of steam and is then allowed to completely cool. The cool water is let off, superheated air is introduced, and the vessels are thus dried. The isolating-covering is now tight at every place. It is washed with clean cold water, whereafter the vessel is ready for the reception of the beer.

The dimensions or sizes of the metallic vessels may be chosen at will. While wooden vats for fermenting purposes can be made only for from forty to fifty hectoliters and wooden store-casks only for from one hundred to one hundred and fifty hectoliters, the metallic vessels may have sizes from five hundred up to one thousand hectoliters. If necessary, they may be manufactured, built up, and connected with the masonry directly at the place where the store-cellar is to be erected, and owing to their material (for instance, iron) they may be made and kept sterile. The vessels, either cubical or cylindrical ones, are arranged in groups of two, four, six, &c., pieces, which are separated from each other by walls with tightly-closing doors or the like, so that it is not necessary to cool the cellar in its whole extent if but a part of the same is occupied by beer. The cooling-pipes are consequently provided with suitably-located valves or the like. The various parts of the cellar are accessible only by means of airtight doors, preferably of iron, that are furnished with well-planed tightening-surfaces and rubber packings, so that, so to say, sterile cellar-spaces are produced, into which may be led from the ceiling of the cellar filtered air that is perfectly free of germs or the like.

Another advantage of the metallic vessels aforedescribed resides in the fact that they do not occupy by far the same extent of space as the usually employed wooden fermenting-vats, and leave not so much dead-space between themselves as those, so that, as already stated, a considerably less quantity of coldness is required. The saving in space as well as that in coldness is remarkably great. The coldness-generating plant need, therefore, be very much smaller and is far less expensive, and, finally, the vessels need not be removed from the cellar once or twice a year for the purpose of cleansing, drying, pitching, and the like, as is the case with the wooden vessels hitherto employed. They remain constantly within the cellar with the masonry of which they are firmly connected.

Having now described my invention, what I desire to secure by Letters Patent of the United States is—

As a means for preserving beer during its fermentation and storing, the combination with a series of closed metallic fermentation and storing vessels, of means for introducing the beer into and drawing it off said vessels, said means being located at the front end of the same; a cellar or cellar plant the bottom, walls and ceiling of which are in close neighborhood to the bottom, rear and middle part of the vessels; means for separating the spaces at and around said parts from the space at and around the front part of the said vessels, said means being located behind those for introducing and drawing off the beer; a protective wall located some distance from the front surface of the vessels, leaving a space for the circulation of cold air between said protective wall and the vessels, substantially as described.

In witness whereof I have hereunto set my hand in presence of two witnesses.

VALENTIN LAPP.

Witnesses:
RUDOLPH FRICKE,
CHAS. J. BURT.